United States Patent
Caruel et al.

(10) Patent No.: US 12,104,555 B2
(45) Date of Patent: Oct. 1, 2024

(54) THRUST REVERSER FOR TURBOJET ENGINE

(71) Applicant: SAFRAN NACELLES, Gonfreville l'Orcher (FR)

(72) Inventors: Pierre Charles Caruel, Moissy-Cramayel (FR); Loïc Chapelain, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 0 days.

(21) Appl. No.: 17/907,743

(22) PCT Filed: Mar. 31, 2021

(86) PCT No.: PCT/FR2021/050568
§ 371 (c)(1),
(2) Date: Jan. 23, 2023

(87) PCT Pub. No.: WO2021/198617
PCT Pub. Date: Oct. 7, 2021

(65) Prior Publication Data
US 2024/0209812 A1    Jun. 27, 2024

(30) Foreign Application Priority Data
Apr. 2, 2020   (FR) ..................................... 2003315

(51) Int. Cl.
*F02K 1/72*    (2006.01)
*F02K 1/56*    (2006.01)
*F02K 1/76*    (2006.01)

(52) U.S. Cl.
CPC .............. *F02K 1/566* (2013.01); *F02K 1/763* (2013.01)

(58) Field of Classification Search
CPC . F02K 1/566; F02K 1/763; F02K 1/62; F02K 1/625; F02K 1/70; F02K 1/72; F02K 1/76
See application file for complete search history.

(56) References Cited

U.S. PATENT DOCUMENTS 3,059,426 A * 10/1962 Laucher ................. F02K 1/625
                                                239/265.31
3,419,218 A * 12/1968 Campbell ............... F02K 1/76
                                                239/265.37

(Continued)

FOREIGN PATENT DOCUMENTS

FR    2913664 A1    9/2008
FR    3038587 A1    1/2017

(Continued)

OTHER PUBLICATIONS

International Search Report issued in International Application No. PCT/FR2021/050568 on Jun. 22, 2021 (2 pages).

*Primary Examiner* — Gerald L Sung
(74) *Attorney, Agent, or Firm* — Bookoff McAndrews, PLLC

(57) ABSTRACT

This summary relates to a thrust reverser for a turbojet engine mounted on an engine nacelle pylon, comprising a fixed part, a movable part, coaxial and mounted in translation with respect to the fixed part and sealingly inserted against the fixed part by blocking an air outlet passage in a closed state whereas the air outlet passage is freed up in the extended state, and a single actuating device including a beam, a slider, and a driving device, configured to drive the movable part in translation with respect to the fixed part, wherein the beam comprises a stop taking the form of a protuberance protruding on a radially outer surface of the beam and configured to have a clearance with respect to said engine nacelle pylon.

13 Claims, 5 Drawing Sheets

(56) References Cited

U.S. PATENT DOCUMENTS

| | | | | |
|---|---|---|---|---|
| 7,484,356 B1* | 2/2009 | Lair | ............ | F02K 1/72 |
| | | | | 60/230 |
| 2010/0040466 A1* | 2/2010 | Vauchel | ............ | B64D 27/18 |
| | | | | 415/213.1 |
| 2010/0132331 A1* | 6/2010 | Tsou | ............ | F02K 1/72 |
| | | | | 60/226.2 |
| 2012/0228403 A1* | 9/2012 | Caruel | ............ | F02K 1/72 |
| | | | | 239/265.11 |

FOREIGN PATENT DOCUMENTS

| | | |
|---|---|---|
| WO | 2016116709 A1 | 7/2016 |
| WO | 2018100288 A1 | 6/2018 |

* cited by examiner

[Fig. 1]
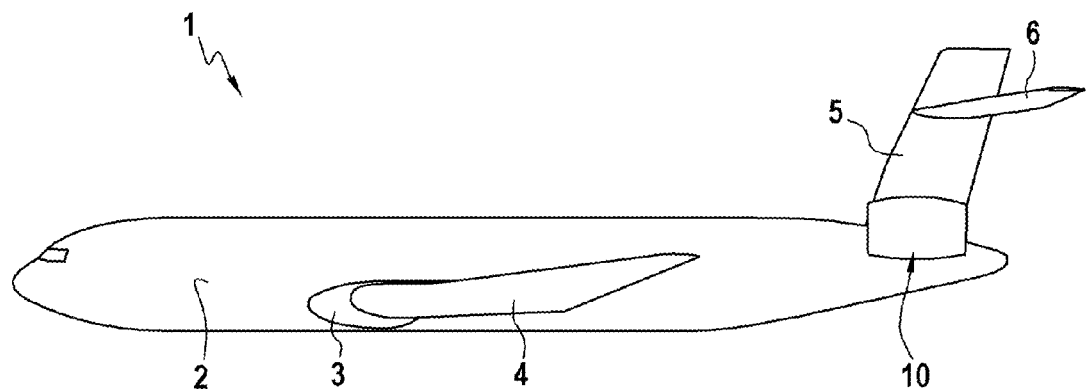
[Fig. 2]
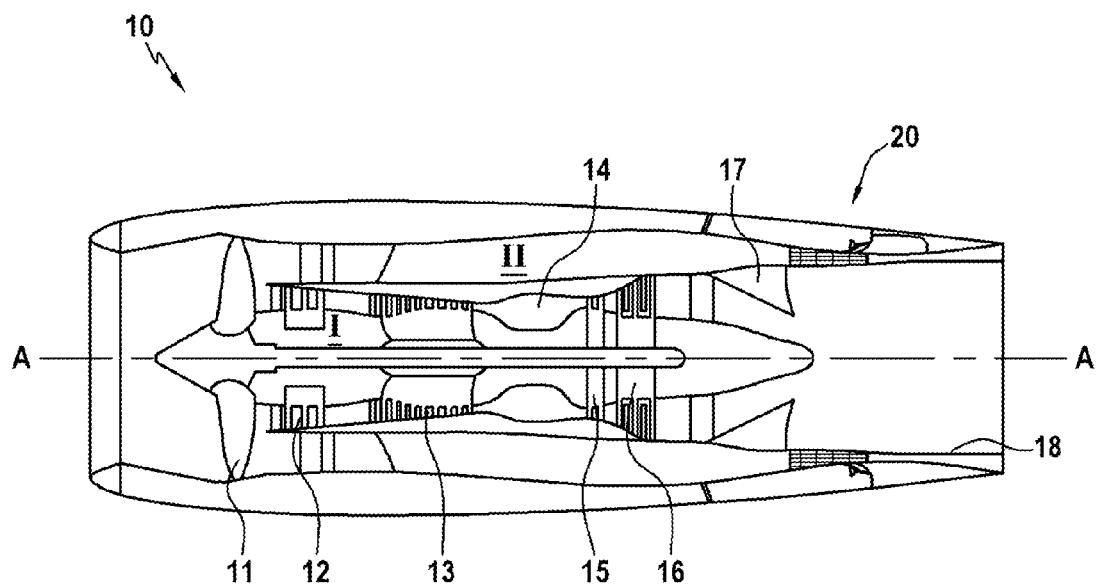

[Fig. 3]
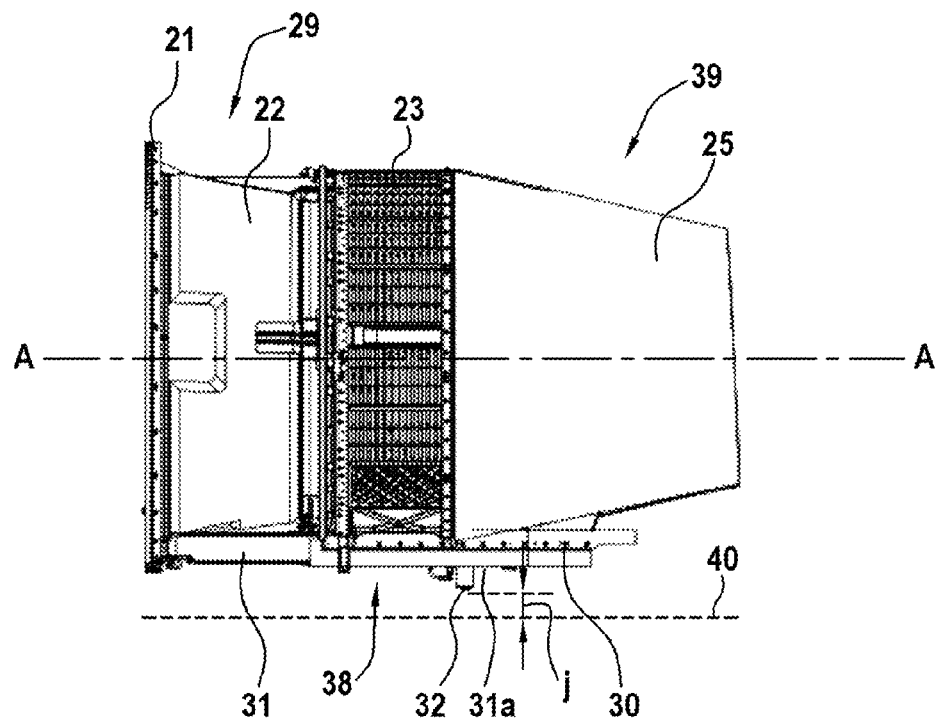
[Fig. 4]
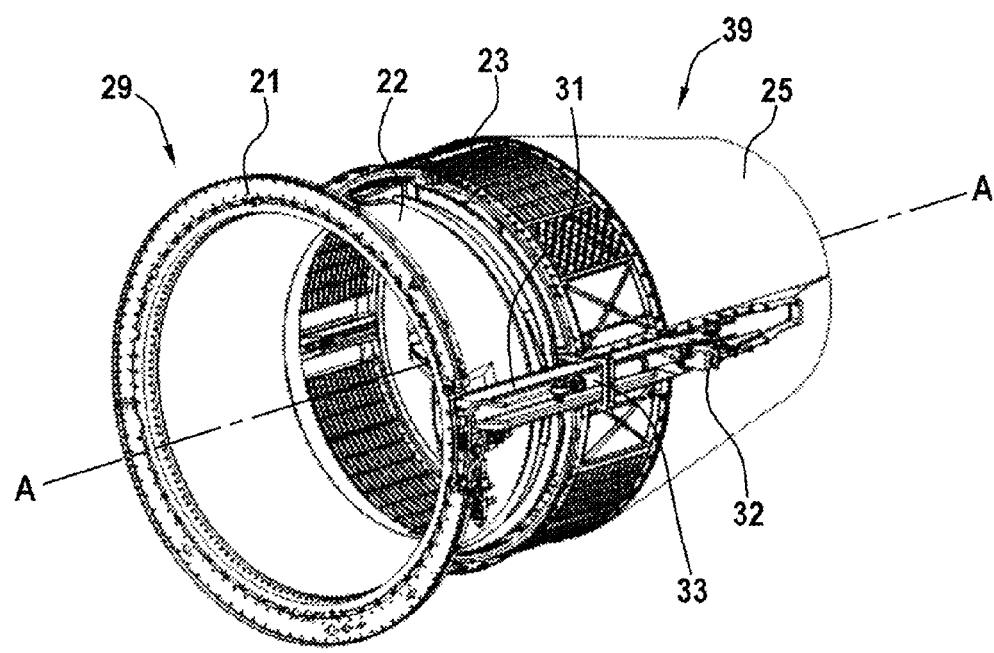

[Fig. 5]
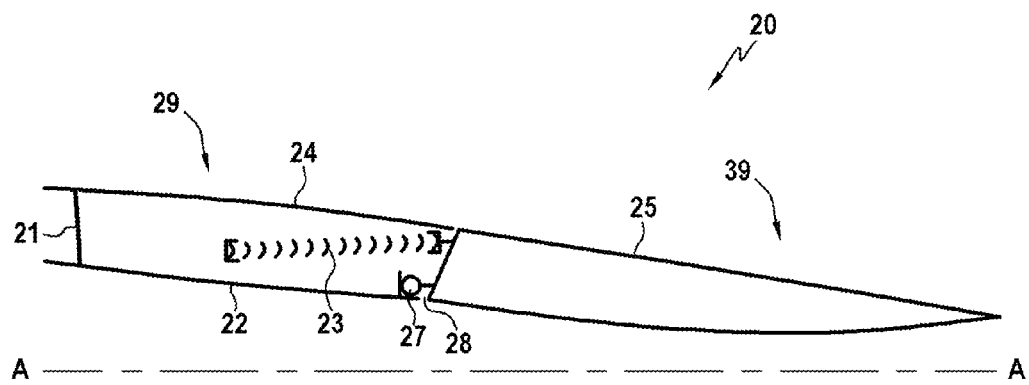
[Fig. 6]
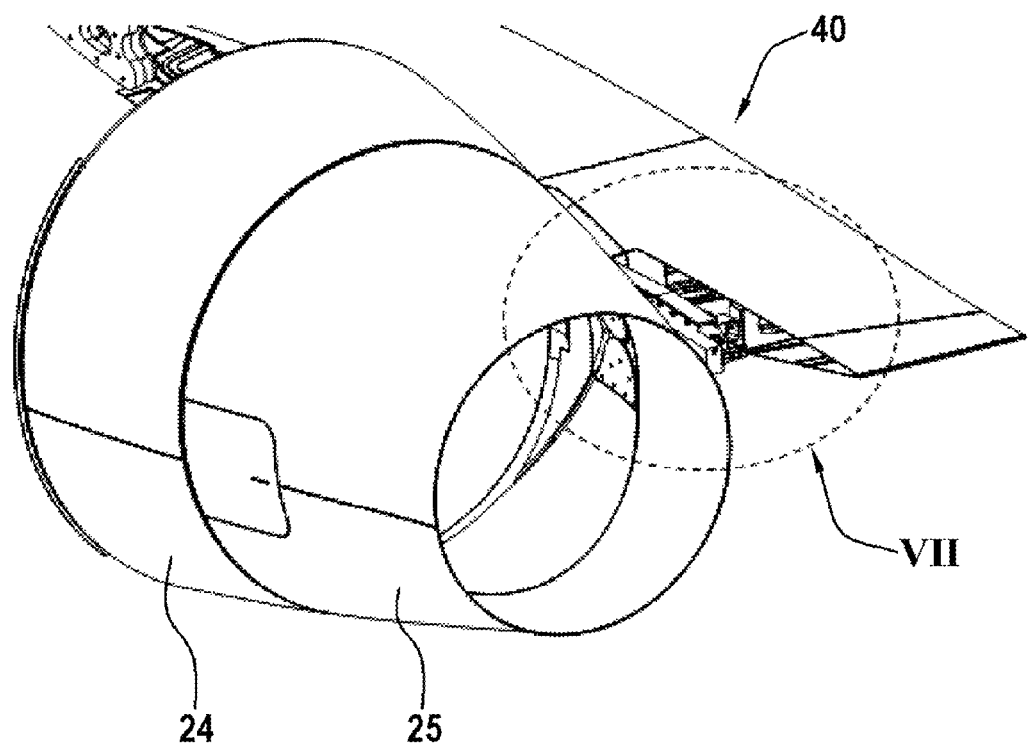

[Fig. 7]
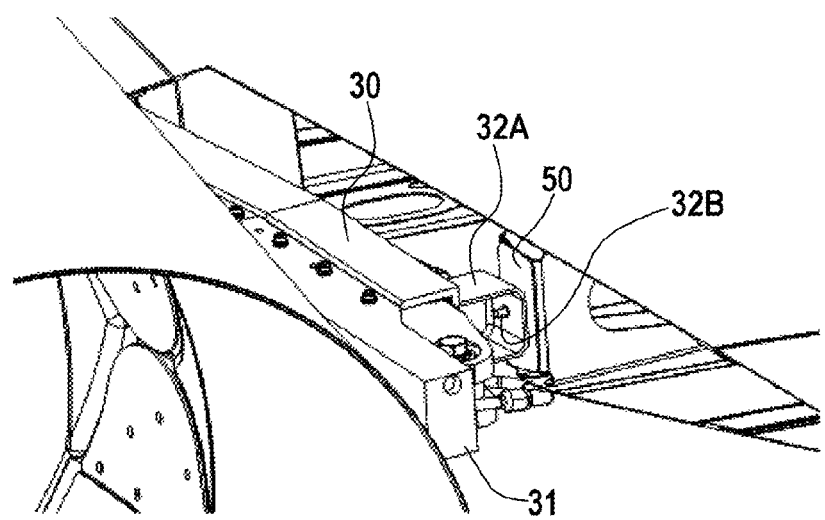
[Fig. 8]
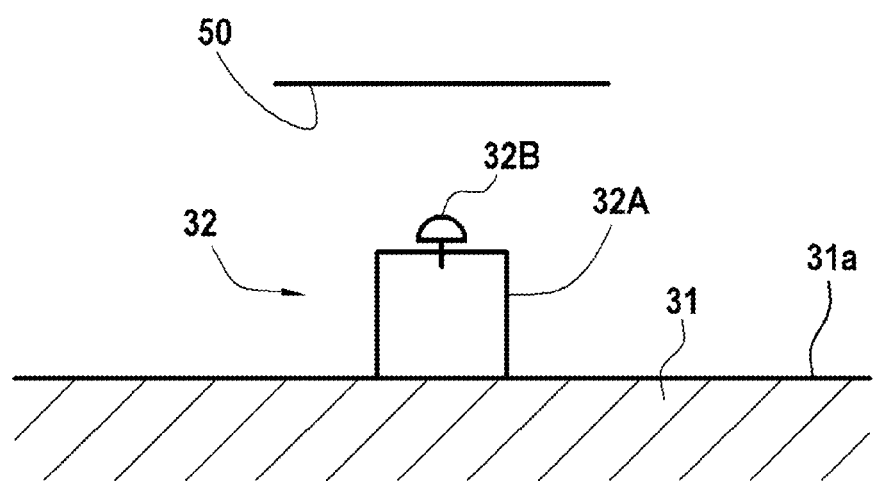

[Fig. 9]
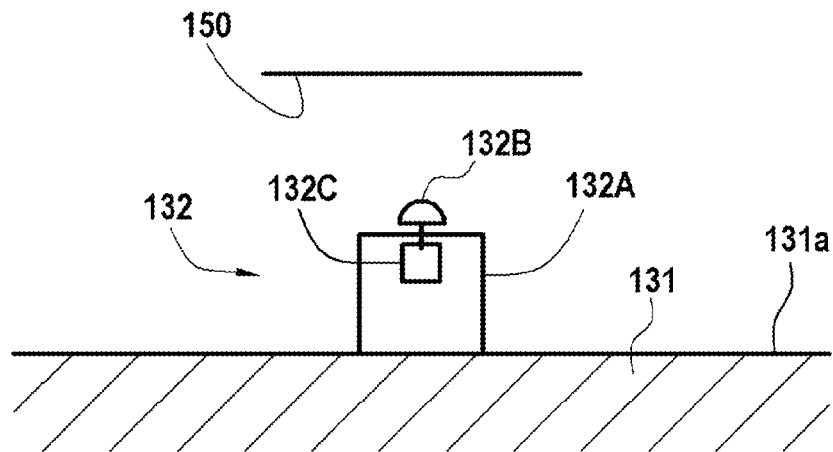
[Fig. 10]
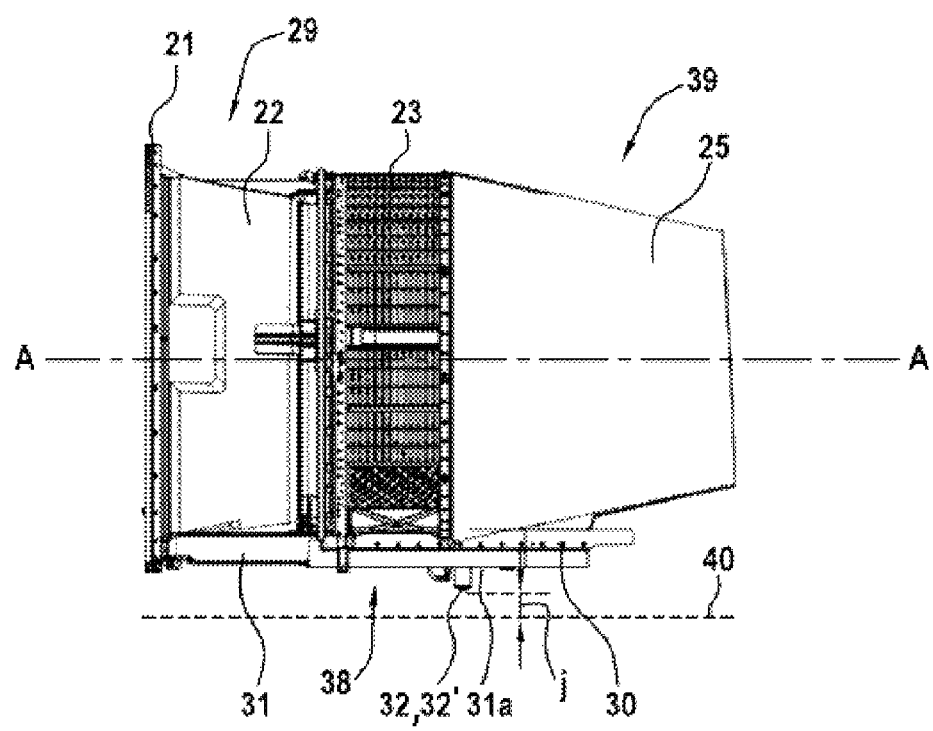

THRUST REVERSER FOR TURBOJET ENGINE

CROSS-REFERENCE TO RELATED APPLICATION(S)

This patent application is a national stage entry of International Application No. PCT/FR2021/050568 filed on Mar. 31, 2021, now published as WO 2021/198617 A1, which claims benefit to French Application No. FR2003315 filed on Apr. 2, 2020.

TECHNICAL FIELD

This summary relates to a thrust reverser for a turbojet engine, and more particularly a stress take-up system on an engine nacelle pylon.

Such a thrust reverser can be used for any type of turbojet engine, in particular for civil aviation turbojet engines.

PRIOR ART

Thrust reversers are elements of a turbojet engine making it possible to guide forward a part of the air flow crossing the turbojet engine, in order to reverse the thrust exerted by the turbojet engine and slow down the aircraft on which the turbojet engine is mounted in the event of an emergency landing or braking, for example when abandoning a take-off.

In particular, the known thrust reversers include thrust reversers with grids. The latter comprise grids extending over a circumference of the turbojet engine and having aerodynamic profiles directed forward, as well as actuators driving the grids and a movable cowl. Normally, i.e. when the turbojet engine generates a thrust, for example in the flight phase, the movable cowl is in a closed state in which it covers the grids, thus preventing the air from escaping from the turbojet engine via these grids; on the other hand when the reverser is extended in order to generate a counter-thrust, the movable cowl slides along the turbojet engine, and is then in an extended state in which it uncovers the grids, thus allowing the air flow to cross them and to be redirected forward.

In certain thrust reverser assemblies of this type, the movable cowl is driven along the pylon by two actuators. Such a structure requires great precision of assembly in order to obtain a tight fit between the fixed part and the movable part of the thrust reverser and thus ensure the seal between these latters while restricting the fixed structure as little as possible. Such a tight fit leads to the transmission by the reverser of any unwanted stresses from the engine to the pylon or to the nacelle. In addition, the control of the two actuators must be synchronized in order not to introduce additional stresses.

It is then advantageous to produce a thrust reverser for a turbojet engine comprising only one actuator. Specifically, such a configuration is easier to assemble and simplifies the control of the actuator.

However, the use of a single actuator unbalances the structure of the reverser. Specifically, the opening of the thrust reverser during its activation causes a stress toward the back of the reverser, which manifests as a significant moment and high bending at the beam comprising the single actuator, in particular in the event of an emergency when the stresses are more significant. This high bending then leads to difficulties in ensuring the sliding of the movable part with respect to the fixed part; in addition, it requires an overdimensioning of the beam in order to give it resistance.

There is therefore a real need for a thrust reverser comprising only a single actuator and making it possible to at least partly solve these problems.

SUMMARY OF THE INVENTION

This summary relates to a thrust reverser for a turbojet engine, said turbojet engine being mounted on an engine nacelle pylon and having a center-line, comprising
- a fixed part, designed to be mounted on the turbojet engine so as to encircle the latter,
- a movable part, coaxial and mounted in translation with respect to the fixed part between a closed state and an extended state, the movable part being sealingly inserted against the fixed part by blocking an air outlet passage in the closed state whereas the air outlet passage is freed up in the extended state, and
- a single actuating device including
  - a beam, secured to the fixed part, extending axially along the outer surface of the fixed part,
  - a slider, secured to the movable part, mounted in translation on the beam, and
  - a driving device, configured to drive the movable part in translation with respect to the fixed part,
  - wherein the beam or the slider comprises a stop taking the form of a protuberance protruding on a radially outer surface of said beam or slider and configured to have a clearance in the closed state with respect to said engine nacelle pylon.

Such a thrust reverser has the advantage of securing the switching of the thrust reverser between the closed state and the extended state allowing the redirection of the air flow forward, while ensuring the sliding of the movable part with respect to the fixed part. In particular, such a thrust reverser has reduced bending during the operation of the thrust reverser, this bending being limited by the stop that then bears on the engine nacelle pylon, thus allowing the driving device to operate correctly, including in the event of an emergency. The translation of the movable part with respect to the fixed part is embodied along the center-line of the turbomachine. This thrust reverser thus has a coupling or an uncoupling according to the situation: the stop for example allows coupling between the movable part of the reverser and the engine nacelle pylon in the extended state when the stresses are significant and when the transmission of these stresses is desired, for example in the event of an emergency braking; on the other hand, the movable part of the reverser and the engine nacelle pylon can be uncoupled, i.e. without contact, in the closed state, in flight or in the take-off phase for example, and where applicable in the extended state when the stresses undergone by the movable part are lower and this transmission of stress is not desired, for example during normal braking; transmission of unwanted stresses is thus avoided.

In this summary, the terms "axial", "radial", "tangential", "inner", "outer" and their derivatives are defined with respect to the center-line of the turbomachine; the term "axial plane" is understood to mean a plane passing through the center-line of the turbomachine and the term "radial plane" should be understood to mean a plane perpendicular to this center-line; finally, the terms "upstream", "downstream", "forward" and "backward" are defined with respect to the main direction of flow of the air in the turbomachine.

In certain embodiments, the reverser comprises a single driving device.

In certain embodiments, the driving device is mounted between the beam and the slider.

In certain embodiments, at least one stop is carried by the beam. In this way, the axial position of the stop remains unchanged.

In certain embodiments, the stop is located at a distance from the front end of the beam between 2.3 and 3.1 times the length of the track of the movement of the movable part between the closed position and the extended position, preferably between 2.5 and 2.8 times the length of the track of the movement of the movable part.

Such a position of the stop makes it possible, by controlling the distance from the stop to the coupling between the fixed part and the movable part, to block a part of the beam which is greater when the stop is further from the coupling between the fixed part and the movable part.

In certain embodiments, the stop is configured to touch the engine nacelle pylon beyond a given level of bending of the beam corresponding to a deformation of the beam under the effect of an emergency operation of the thrust reverser.

In other words, the stop does not touch the engine nacelle pylon for a level of bending of the beam corresponding to a normal operation of the thrust reverser, i.e. for example a deformation in the order of 15 mm to 18 mm for an engine equipped with a fan of 1.1 m in diameter, whereas the stop touches the engine nacelle pylon for an emergency operation of the thrust reverser, for example when the deformation reaches 18 mm.

The term "normal operation" is understood to mean the operation of the thrust reverser when it is entirely extended to slow down an aircraft during a landing under normal conditions, the thrust reverser being completely extended while the turbomachine operates at a rating near its idle rating. Such a clearance makes it possible to ensure that when the thrust reverser is not in operation, deformations of low amplitude, for example due to vibrations or aerodynamic stresses applied to the outside of the nacelle, do not lead to any contact between the stop and the nacelle pylon, limiting undesirable transmissions of unwanted stresses.

The term "emergency operation", or "critical operation", should be understood to mean the operation of the thrust reverser when it is fully extended in the event of an emergency landing, or interruption of the take-off, when the reverser is activated while the aircraft speed is above the normal speed or the turbojet engine is operating at a rating close to full power.

In certain embodiments, the beam or the slider has a second stop positioned in a common radial plane with the first stop and configured to have a clearance with respect to the engine nacelle pylon substantially equal to the clearance of the first stop.

By positioning the second stop in the same radial plane as the first stop, the second stop can supplement the stress take-up of the second stop for one and the same amount of bending, in order to form a second stress path and thus share the stress between the two stops. In particular, such a disposition makes it possible to take up the stresses due to the bending of the beam in the plane containing the center-line and the beam, in the direction of the beam, and in addition makes it possible to take-up any torsional moment along the center-line, in principle lower.

In certain embodiments, at least one of the stops comprises a contact element.

The term "contact" element should be understood to mean a part having a structure allowing a wide distribution of the contact of the stop on the counteracting surface of the pylon, and made of a flexible material, for example made of elastomer or other polymer materials such as nylon, Ertacetal or Teflon, in order to improve the vibrations which can be transmitted, or limit the effects of hammering against the pylon.

In certain embodiments, at least one stop includes a depth-adjusting device.

This device makes it possible to adjust the depth of the stop without disassembling and reassembling the stop, or changing the parts. This makes it possible to adjust the clearance, for example to compensate for wear of the stop, and to offset the geometrical tolerances of the different components.

In certain embodiments, at least one stop comprises a bracket and a contact element designed to be replaced.

In such a structure, the bracket is the element coupling the stop to the beam. The contact element is made of elastomer or of other polymer materials such as nylon, Ertacetal or Teflon, or any other material having elasticity properties making it possible to limit the vibrations and hammering of the stop.

In certain embodiments, the contact element is removable and intended to be replaced in the event of wear.

The contact element thus plays the role of a wear part, to be worn preferentially to the engine nacelle pylon. Another structure of the stop can be used, for example in which the bracket and the contact element are one and the same part, or any other structure or combination of materials making it possible to provide the wear element and vibration-damping functions.

In certain embodiments, the engine nacelle pylon has a bearing surface counteracting to the stop.

The bearing surface makes it possible to receive the bearing of the stop when the bending of the beam causes a displacement greater than the clearance for which provision is made between the stop and the pylon, and thus to take up the stresses due to the operation of the thrust reverser.

In this summary, the term "fixed part" should be understood to mean all the parts of the thrust reverser which are fixed in the frame of reference of the engine. In particular, the fixed part comprises an attachment flange of the thrust reverser on a fixed casing surrounding an air path of the engine, a fixed cowl surrounding the fixed casing and the grids, and the beam to which the driving device is attached.

It will be understood that the description as a "fixed part" is illustrative, and that the appellation "fixed" does not preclude the existence of inner deformations or rotational mobility, while the coupling elements between the fixed and movable parts will be considered as forming part of one or the other of the fixed and movable parts according to the end in question.

The term "movable part" should be understood to mean the parts of the thrust reverser which are translationally movable with respect to the fixed part. In particular, the movable part comprises the slider, a movable cowl sealingly inserted against the fixed part in the closed state, at least one reverser grid extending around a circumferential contour of the fixed cowl and at least one blocking panel used to obstruct direct exit from the engine in order to deviate the air flow through the grids.

It will be understood that the structures of the movable and fixed parts are illustrative and are not limited to the embodiments of this summary. In particular, the grids can be elements of the fixed part.

The driving device can be embodied by a single actuator,
The contact element can take the form of a contact pad.
The thrust reverser may comprise at least one lock to hold together the fixed and movable parts, and in particular two locks.

This summary also relates to a propulsion assembly comprising a turbojet engine and a thrust reverser as claimed in any of the preceding embodiments.

The turbojet engine is preferably a mixed-flow turbojet engine; however it can also be any other type of turbojet engine.

This summary also relates to an aircraft comprising a propulsion assembly as claimed in any of the preceding embodiments.

The clearance can have a value between 5 mm and 25 mm, preferably between 10 mm and 20 mm.

BRIEF DESCRIPTION OF THE DRAWINGS

The appended drawings are schematic and above all aim to illustrate the principles of the summary.

On these drawings, from one figure to the other, identical elements (or element parts) bear the same reference signs. Furthermore, elements (or element parts) belonging to exemplary embodiments which are different but have a similar function bear, in the figures, numerical references incremented by 100, 200, etc.

FIG. 1 is a side view of an example of an aircraft.

FIG. 2 is an axial section view of an example of a mixed-flow turbojet engine.

FIG. 3 shows a side view of an example of a thrust reverser, where the nacelle is partially shown.

FIG. 4 shows a perspective view of this thrust reverser.

FIG. 5 is a section view along an axial plane of this thrust reverser.

FIG. 6 is a perspective view of the thrust reverser comprising the outer cowls and bearing on an engine nacelle pylon.

FIG. 7 shows an enlargement of area VII of FIG. 6.

FIG. 8 is a diagram showing a first example of a stop.

FIG. 9 is a diagram showing a second example of a stop.

FIG. 10 shows a variant embodiment of the thrust reverser of FIG. 3.

DESCRIPTION OF THE EMBODIMENTS

FIG. 1 is a schematic side view of an example of an aircraft 1, comprising a fuselage 2 from which wings 4 extend laterally from the root 3. The aircraft 1 has a stabilizer at the back, comprising a fin 5 to which two rudders 6 are attached. A turbojet engine 10 is mounted on either side of the fuselage 2, aft of the fuselage, by way of an engine nacelle pylon.

The example of an aircraft 1 of FIG. 1 is solely illustrative, and any other disposition of the structural elements is possible according to the general knowledge of those skilled in the art. In particular, the turbojet engines 10 are not limited to two, and can be disposed under the wing 4 rather than aft of the fuselage 2.

FIG. 2 shows an example of a mixed-flow turbojet engine 10 having a center-line A shown by the dot-and-dash lines. The flow of air through the turbojet engine 10 is shown on the diagram from left to right. The inlet of the turbojet engine 10 has a fan 11 drawing the air inside the turbojet engine 10. The air flow is then divided into a primary air flow I and a secondary air flow II. The primary air flow I is successively compressed by a low-pressure compressor 12 and a high-pressure compressor 13, respectively driven by a low-pressure turbine 16 and a high-pressure turbine 15. Between the compressors 12, 13 and the turbines 15, 16 is located a combustion chamber 14 receiving the air compressed by the compressors 12, 13 and into which the fuel is injected in order to perform the combustion. The combustion gases depart from the combustion chamber 14 driving the turbines 15 and 16 and meet at the outlet the secondary air flow II, the latter crossing the turbojet engine 10 on the radial periphery of the primary air flow I. A mixer 17 is positioned at the outlets of the turbines 15, 16 to promote the mixture of the two gas flows I, II and thus optimize the total thrust of the gas exiting through the nozzle 18, at the back end of the turbojet 10.

The example of the turbojet engine 10 of FIG. 2 is illustrative and the turbojet engine 10 is not limited to this embodiment.

A back part of the turbojet engine 10 has a thrust reverser 20, located on a circumference of the turbojet engine 10.

FIGS. 3 and 4 respectively show side and perspective views of this thrust reverser 20, wherein a cowl 24 has not been shown in order to reveal the inner structure of the thrust reverser 20; this cowl 24 will be shown with reference to FIG. 5.

The thrust reverser 20 comprises a fixed part 29, comprising the fixed parts in the reference frame of the engine, and a movable part 39, in translation with respect to the fixed part 29.

The fixed part 29 comprises an attaching flange 21, making it possible to attach the thrust reverser 20 on a casing of the turbojet engine 10, a fixed casing 22, surrounding an air path of the engine, and a fixed cowl 24 (visible on FIG. 5) surrounding the fixed casing 22.

The movable part 39 is coaxial with the fixed part 29 and comprises at least a reverser grid 23, extending over a circumferential contour of the turbojet engine 10, and a movable cowl 25. The movable cowl 25, provided downstream of the grids 23, is configured to be sealingly inserted against the fixed part 29 in the closed state. In the closed state, the grid 23 is located between the casing 22 and the fixed cowl 24. The movable part further comprises at least one blocking panel forming an obstacle to the flow exiting the engine in order to deviate the air flow through the grids 23 during the operation of the reverser 20, i.e. in the extended state.

The thrust reverser comprises an actuating device 38, comprising a beam 31, a slider 30 and a driving device 33. The beam 31 forms a single part with the fixed part 29 and extends axially along the outer surface of the fixed part 29; the slider 30 is secured to the movable part 39 and translationally mounted on the beam 31; the driving device 33 is used to drive the movable part 39 in translation with respect to the fixed part 29, for example being mounted between the beam 31 and the slider 30.

The driving device 33 takes the form of a single actuator 33. The action of this actuator 33 is described with reference to FIG. 5.

FIG. 5 is a section along an axial plane of the thrust reverser 20. In particular, FIG. 5 shows the cowls 24, 25 and the grids 23.

When the thrust reverser 20 is not in operation, the movable cowl 25 is added in a sealed manner against the fixed part 29, thus preventing the passage of the air through the grids 23. The fixed casing 22 thus bears at its downstream end a ring seal 27 against which a border 28 of the movable part 39 is applied.

The movable part 39 is mounted in axial translation with respect to the fixed part 29 and the action of the driving device 33 allows the thrust reverser 20 to enter an extended state wherein the movable cowl 25 and the grids 23 are disengaged from the fixed cowl 24 such that an air passage is left between the fixed part 29 and the movable part 39.

This air passage crosses the grids 23, the orientation of which makes it possible to redirect the air flow upstream, and thus slow down the aircraft 1.

During the operation of the thrust reverser 20, the forward expulsion of the gas causes a backward thrust on the thrust reverser 20, which is transmitted to the turbojet engine 10 by the driving device 33 to slow down the aircraft 1. Due to the unbalance of the structure of the thrust reverser 20 caused by the presence of a single actuating device 38, a bending moment is generated and causes the bending of the thrust reverser 20 in a radial direction along an axis passing through the driving device 33.

In other words, the actuating device 38 is radially moved outward, and the thrust reverser 20 is moved as a consequence. The level of movement is greater the further downstream the point in question is. This makes it possible to cause levels of movement in the order of tens of mm, or even in the order of hundreds of mm at points of the back end of the reverser 20.

This bending deformation poses the risk of preventing the translation of the movable part 39 against the fixed part 29, and requires an increase in the functional clearances between the movable part 39 and the fixed part 29.

To limit the deformation, provision is made for a stop 32 in the form of a protuberance on a radially outer surface 31a of the beam 31. This stop 32 is located facing the engine nacelle pylon 40.

Provision is made for the stop 32 to have a clearance j with respect to the engine nacelle pylon 40, such that the stop 32 bears on the pylon beyond a given level of bending of the actuating device 38.

To effect this coupling, the clearance j between the stop 32 and the engine nacelle pylon 40 can be chosen to have a value between 5 mm and 25 mm, preferably between 10 mm and 20 mm in order to limit contact in the event of an emergency operation. In this example, the clearance j is of 16 mm.

In particular, in order to promote the take-up of stresses by the engine nacelle pylon 40, the stop 32 is located on a distal part of the beam 31, at a distance from the back end of the beam 31 between 2.3 and 3.1 times the length of the track of movement of the movable part between the closed position and the extended position, and preferably between 2.5 and 2.8 times the track of movement of the movable part. In this example, the stop is located at a distance from the back end of the beam 31 equivalent to 2.65 times the track of the movable part.

As can be seen in FIG. 7, corresponding to area VII of FIG. 6, the stop 32 is composed of a bracket 32A and a contact element 32B. The bracket 32A is a structural element by which the stop 32 is secured to the beam 31, while the contact element 32B makes it possible to distribute the contact across the counteracting surface of the pylon 40, reduce the transmission of vibrations between the turbojet engine 10 and the pylon 40, and limit hammering effects against the pylon 40, for example in the event of high-amplitude vibrations of the beam.

For example, the contact element 32B can take the form of a pad made out of an elastomer material or out of other polymer materials such as nylon, Ertacetal or Teflon. In addition, to limit damage to the engine nacelle pylon 40, the contact element 32B can be a wear part designed to be replaced, for example by being removable and made of a material of low hardness compared to the material of the bearing surface 50 of the engine nacelle pylon 40, in order to preferentially wear the replaceable contact element 32B.

The replacement of the contact element 32B can be defined according to a criterion of flight time, number of flights, number of use cycles of the thrust reverser 20, level of wear, after a use of the thrust reverser 20 in critical operation or any other criterion deemed relevant by those skilled in the art.

The engine nacelle pylon 40 has a surface counteracting to the stop 32, provided to constitute a bearing surface 50 of the stop 32. In particular, this bearing surface 50 can have a structure or material suitable for receiving the stop 32.

According to a first variant shown in FIG. 9, in order to adjust the clearance between the stop 132 and the bearing surface 150 of the pylon, for example when the contact element 132B has wear not requiring any replacement, the stop 132 has a depth-adjusting device 132C, i.e. a device for adjusting the radial extension of the stop 132 without disassembling the stop 132.

FIG. 10 shows a thrust reverser having a first stop 32 and a second stop 32' used to supply a second stress path from the reverser toward the engine nacelle pylon 40. This second stop 32' is located in the same radial plane as the first stop 32, and has the same clearance j as the first stop 32, in order to be used as a complement to the first stop 32 so that the two stops 32, 32' touch the engine nacelle pylon 40 at a same level of deformation of the beam 31, and thus taking up a bending stress as well as a torsional moment.

The second stop 32' may have the same structure as the first stop 32, and also comprise a bracket and a contact element designed to be replaced, as well as a depth-adjusting device.

The second stop 32' is not limited to this embodiment. In particular, it may be positioned at a point further forward or backward than the first stop 32, have a clearance different from the first clearance j or else touch the engine nacelle pylon 20 beyond a level of deformation greater than the given level of deformation.

Although the first invention has been described with reference to specific exemplary embodiments, it is obvious that modifications and changes can be made to these examples without departing from the general scope of the invention as defined by the claims. In particular, individual features of the different embodiments illustrated/mentioned can be combined in additional embodiments. Consequently, the description and drawings must be considered in an illustrative sense rather than a restrictive one.

The invention claimed is:

1. A thrust reverser for a turbojet engine, said turbojet engine being mounted on an engine nacelle pylon and having a center-line, comprising
   a fixed part, designed to be mounted on the turbojet engine so as to encircle the turbojet engine,
   a movable part, coaxial and mounted in translation with respect to the fixed part between a closed state and an extended state, the movable part being sealingly inserted against the fixed part by blocking an air outlet passage in the closed state, whereas the air outlet passage is freed up in the extended state, and
   a single actuating device including
      a beam, secured to the fixed part, extending axially along an outer surface of the fixed part,
      a slider, secured to the movable part, mounted in translation on the beam, and
      a driving device, configured to drive the movable part in translation with respect to the fixed part,
   wherein the beam or the slider comprises at least one stop taking the form of a protuberance protruding on a radially outer surface of said beam or slider and configured to have a clearance in the closed state with respect to said engine nacelle pylon.

2. The thrust reverser as claimed in claim 1, wherein the driving device is a single driving device.

3. The thrust reverser as claimed in claim 1, wherein the driving device is mounted between the beam and the slider.

4. The thrust reverser as claimed in claim 1, wherein the at least one stop is carried by the beam.

5. The thrust reverser as claimed in claim 4, wherein the at least one stop is located at a distance from a front end of the beam between 2.3 and 3.1 times a length of a track of the movement of the movable part between the closed state and the extended state.

6. The thrust reverser as claimed in claim 1, wherein the at least one stop is configured to touch the engine nacelle pylon beyond a given level of bending of the beam corresponding to a deformation of the beam under an effect of an emergency operation of the thrust reverser.

7. The thrust reverser as claimed in claim 1, wherein the at least one stop comprises a first stop and a second stop, and wherein the beam or the slider has the second stop positioned in a common radial plane with the first stop and configured to have a clearance with respect to the engine nacelle pylon substantially equal to the clearance of the first stop.

8. The thrust reverser as claimed in claim 1, wherein the at least one stop comprises a contact element.

9. The thrust reverser as claimed in claim 1, wherein the at least one stop includes a depth-adjusting device.

10. The thrust reverser as claimed in claim 1, wherein the at least one stop comprises a bracket and a contact element designed to be replaced.

11. The thrust reverser as claimed in claim 10, wherein the contact element is removable and intended to be replaced in the event of wear.

12. A propulsion assembly comprising a turbojet engine and a thrust reverser as claimed in claim 1.

13. An aircraft comprising a propulsion assembly as claimed in claim 12.

* * * * *